(12) United States Patent
Park et al.

(10) Patent No.: US 10,472,221 B2
(45) Date of Patent: Nov. 12, 2019

(54) LIQUID DISPENSER

(71) Applicant: LG ELECTRONICS INC., Seoul (KR)

(72) Inventors: Jongwoo Park, Seoul (KR);
Kwangyong An, Seoul (KR);
Seonwoong Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 33 days.

(21) Appl. No.: 15/651,647

(22) Filed: Jul. 17, 2017

(65) Prior Publication Data

US 2018/0016129 A1 Jan. 18, 2018

(30) Foreign Application Priority Data

Jul. 18, 2016 (KR) .......................... 10-2016-0090828

(51) Int. Cl.
*B67D 1/08* (2006.01)
*B67D 1/00* (2006.01)
(Continued)

(52) U.S. Cl.
CPC ......... *B67D 1/0864* (2013.01); *B67D 1/0014* (2013.01); *C02F 1/003* (2013.01); *F25B 39/00* (2013.01); *F25B 41/003* (2013.01); *B67D 1/0888* (2013.01); *B67D 1/0895* (2013.01); *B67D 1/16* (2013.01); *B67D 2210/0001* (2013.01); *C02F 2101/20* (2013.01); *C02F 2209/40* (2013.01); *C02F 2307/10* (2013.01); *F25B 39/02* (2013.01)

(58) Field of Classification Search
CPC combination set(s) only.
See application file for complete search history.

(56) References Cited

U.S. PATENT DOCUMENTS

| 4,801,048 A | 1/1989 | Credle, Jr. et al. |
| 2008/0210408 A1 | 9/2008 | Sterngold et al. |

FOREIGN PATENT DOCUMENTS

| CN | 203378967 | 1/2014 |
| CN | 103781728 | 5/2014 |

(Continued)

OTHER PUBLICATIONS

Korean Office Action dated Jul. 26, 2017 issued in Application No. 10-2016-0090827.

(Continued)

*Primary Examiner* — Dirk R Bass
(74) *Attorney, Agent, or Firm* — Ked & Associates, LLP (57) ABSTRACT

A water purifier includes: a cooling water tank that keeps cooling water; a stirring member that is provided in the cooling water tank to stir cooling water; a cold water pipe that is provided in the cooling water tank; an evaporator that is provided in the cooling water tank; and a separator on which the evaporator is provided and that is provided over the cold water pipe to divide the internal space of the cooling water tank into a first space and a second space, in which the separator has: a bottom that is horizontally formed and has a center hole through which the stirring member is inserted; a first extension that extends upward from the edge of the center hole; and a plurality of separation walls that extend upward from the top of the bottom and are arranged at a predetermined distance from each other around the center hole.

19 Claims, 10 Drawing Sheets

(51) Int. Cl.
*F25B 41/00* (2006.01)
*C02F 1/00* (2006.01)
*F25B 39/00* (2006.01)
*B67D 1/16* (2006.01)
*F25B 39/02* (2006.01)
*C02F 101/20* (2006.01)

(56) References Cited

FOREIGN PATENT DOCUMENTS

| JP | 2002-318049 | 10/2002 |
|---|---|---|
| JP | 4458497 | 4/2010 |
| KR | 10-0580371 | 5/2006 |
| KR | 10-2010-0078802 | 7/2010 |
| KR | 10-2011-0065979 | 6/2011 |
| KR | 10-1191420 | 10/2012 |
| KR | 10-2013-0041670 | 4/2013 |
| KR | 10-1383024 | 4/2014 |
| KR | 10-2015-0019118 | 2/2015 |

OTHER PUBLICATIONS

Korean Office Action dated Jul. 26, 2017 issued in Application No. 10-2016-0090828.
Korean Notice of Allowance dated Nov. 24, 2017 issued in Application No. 10-2016-0090828.
Korean Notice of Allowance dated Nov. 1, 2017 issued in Application No. 10-2016-0090827.
Australian Office Action dated Jun. 19, 2018 issued in AU Application No. 2017206144.
U.S. Appl. No. 15/651,579, filed Jul. 17, 2017.
U.S. Appl. No. 15/651,647, filed Jul. 17, 2017.
U.S. Appl. No. 16/401,542, filed May 2, 2019.
Chinese Office Action dated Apr. 26, 2019 issued in CN Application No. 201710506836.2.
Chinese Office Action dated Apr. 26, 2019 issued in CN Application No. 201710512119.0.

LIQUID DISPENSER

CROSS-REFERENCE TO RELATED APPLICATION

This application claims priority to Korean Patent Application No. 10-2016-0090828 filed on Jul. 18, 2016 in Korea, and the entire contents of which are hereby incorporated by reference in its entirety under 35 U.S.C. §§ 119 and 365.

BACKGROUND

1. Field

The present disclosure relates to a water purifier.

2. Background

A purifier is a machine that filters harmful substances such as dirt or heavy metals in water using physical and/or chemical treatment. An example of a water purifier is described in Korean Patent Application Publication No. 10-2015-019118 (published on Feb. 25, 2015). This water purifier includes a tank for holding water or other heat-exchanging fluid, and positions an evaporator and a cold water coil carrying purified or filtered water in the tank. A refrigerant flows into the evaporator to cool the water within the tank through a first heat exchange, and the purified water in the cold water coil is cooled by a second heat exchange with the cooled water in the tank. A stirring member in the tank is operated to induce a water movement that accelerates the heat exchanges.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

A water purifier according to an embodiment of the present disclosure is described hereafter in detail with reference to the drawings.

Figure 1:
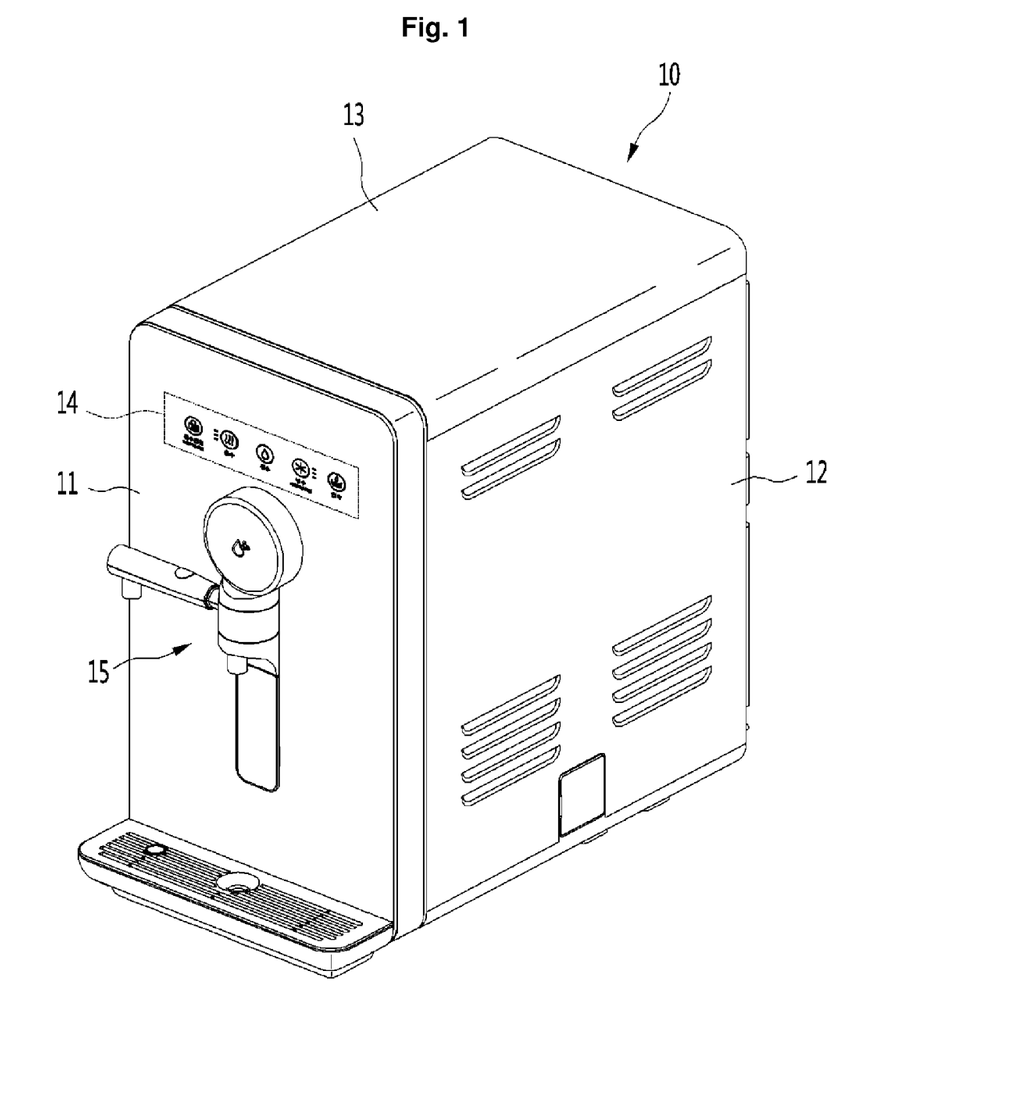
FIG. 1 is a perspective view of a water purifier according to a first embodiment of the present disclosure.

FIG. 1 is a perspective view of a water purifier according to an embodiment of the present disclosure. Referring to FIG. 1, a water purifier 10 according to an embodiment of the present disclosure may be a direct hot and cold water purifier that dispenses cold water or hot water. For example, the 10 may purify (or filter) water received from an external water source and may then heat or cool the purified water. As used herein, a "direct water purifier" is a water purifier that directly dispenses purified water to a user without storing the purified water within a tank. It should be appreciated, however, that a direct water purifier may include a tank for holding other fluids, such as water that is used to cool the purified water.

An external shape or appearance of the water purifier 10 may be formed by combining a plurality of panels. In detail, the water purifier 10 may have a substantially cubic shape formed by combining a front panel 11 for a front, side (or lateral) panels 12 for both sides, a top panel 13 for a top, a rear panel for a rear, and a base (or bottom) panel for the bottom. Various parts for purifying water may be provided in an internal space defined by combining the panels.

An operation display unit (or user interface) 14 that allows a user to input instructions for operating the water purifier 10 and displays information regarding operation states of the water purifier 10 may be provided on the front panel 11. The operation display unit 14 may include a plurality of buttons and may selectively emit light through the buttons. For example, when a user presses, touches, or otherwise selects a button of the operation display unit 14, light is emitted to the selected button so that a user can easily recognizes that the button has been selected, and a function of associated with the selected button is performed. In another example, the operation display unit 14 may include a touch screen to display information, such as a graphical user interface, and to detect a user input related to the displayed information.

In one implementation, the operation display unit 14 may include buttons for selecting the attributes for dispensed water, such as selecting a desired temperature for the dispensed water. For instance, the operation display unit 14 may include buttons for "cold" water (e.g., water cooled below a first prescribed temperature), "hot" water (e.g., water heated above a second prescribed temperature), or room-temperature water (e.g., water that is neither heated nor cooled). Furthermore, the operation display unit 14 may include a button indicating whether a hot water mode has been turned on/off, and the operation display unit 14 may display temperatures of the hot water and the cold water. In another example, the operation display unit 14 may include buttons for displaying certain quantities of the purified water to be dispensed, such as a first button for dispensing a first quantity of purified water and a second button for continuously dispensing purified water. It should be appreciated that the operation display unit 14 may exclude some of these buttons and/or may include other buttons for performing other functions.

The water purifier 10 may further include a water chute (or tube) 15 under the operation display unit 14. The water chute 15 is operated by a user to cause the purified water to be dispensed. The water chute 15 opens/closes to selectively dispense purified water to the user, and water chute 15 may also be referred to as an opening/closing part or an opening/closing nozzle. For example, the operation of the water chute 15 may be controlled by one or more buttons in the operation display unit 14 to dispense purified room-temperature water, cold water, or hot water.

A tray for collecting water dropping from the water chute 15 may be provided at the lower end of the front of the front panel 11. The tray may be formed with a shape defining an internal space or cavity to receive dripping water and may have a grill-shaped cover on the top for filtering foreign substances. The tray may be moved with respect to the front panel 11 or removed to allow a user to receive purified water in water bottles or other containers having heights that exceed a predetermined distance between the water chute 15 and the tray or in containers having wide bottoms. In one example, the tray may include a float or other visual indicator showing a level of water within the tray, so a user can recognize when to empty water from the tray.

Although not shown in the figures, several components including a cooling cycle for cooling water and a cold water production unit for producing cold water are provided inside the panels forming the external shape of the water purifier 10. In detail, the water purifier 10 may include one or more of a compressor that compresses a refrigerant into a high-temperature and high-pressure gas refrigerant, a condenser that condenses the refrigerant from the compressor into a high-temperature and high-pressure liquid refrigerant, and a condenser fan for heat exchange with the condenser. The water purifier 10 may further include an expansion valve that expands the refrigerant from the condenser into a low-temperature and low-pressure 2-phase refrigerant, and an evaporator (to be described below) to which the low-temperature and low-pressure 2-phase refrigerant flows after passing through the expansion valve.

The water purifier 10 may also include a cold water production unit (or cooler), and as described below, the cold water production unit may include the evaporator and a cold water pipe or coil (to be described below) through which cold water flows. The water purifier 10 may further include a heater for heating supplied water to a set temperature. The water purifier 10 may further include a filter assembly that filters foreign substances to purify water received from an external water supplier. The filter assembly may include, for example, one or more of a carbon module and a filter.

Figure 2:
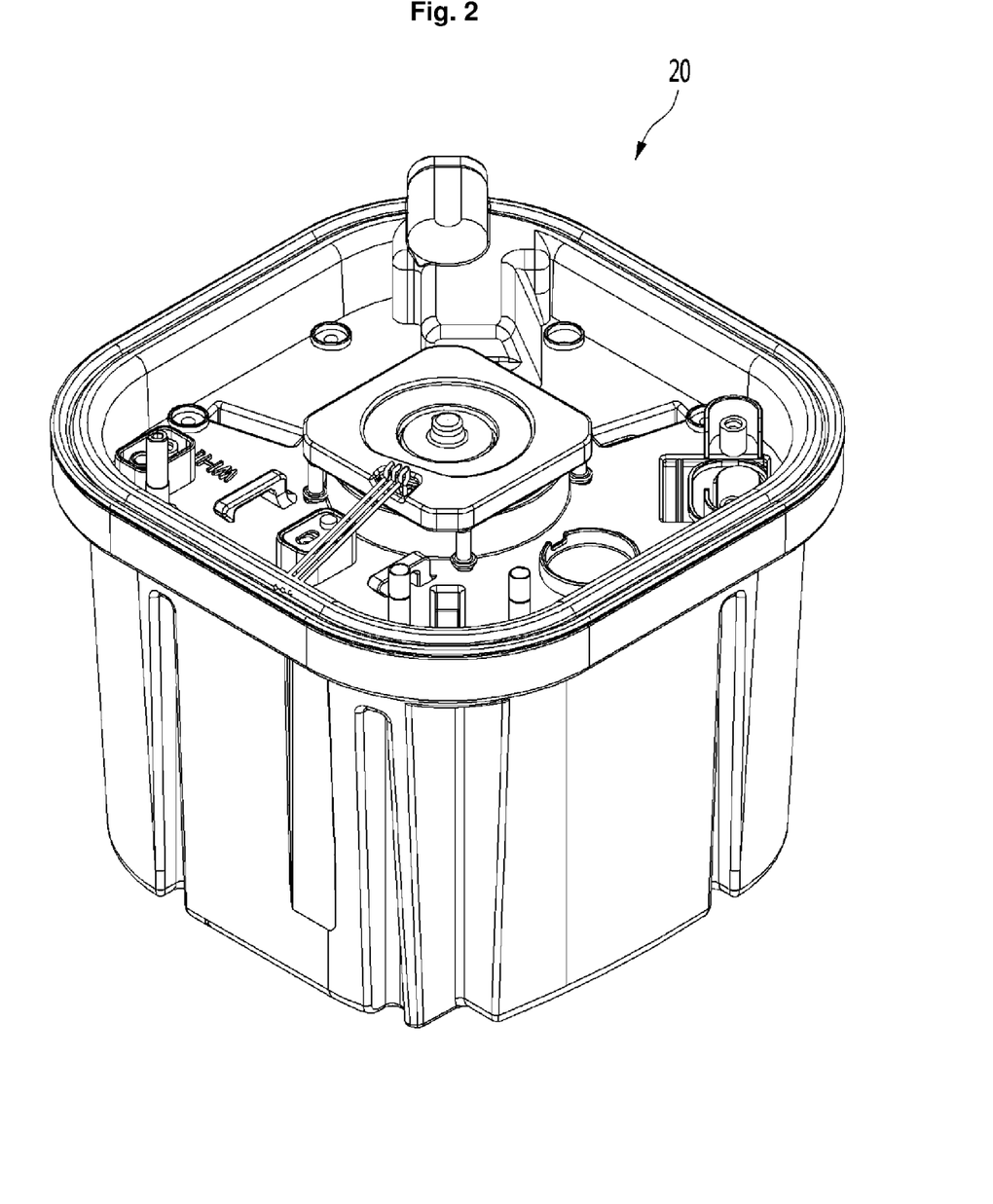
FIG. 2 is a perspective view of a cold water production unit of the water purifier according to the embodiment of the present disclosure.
Figure 3:
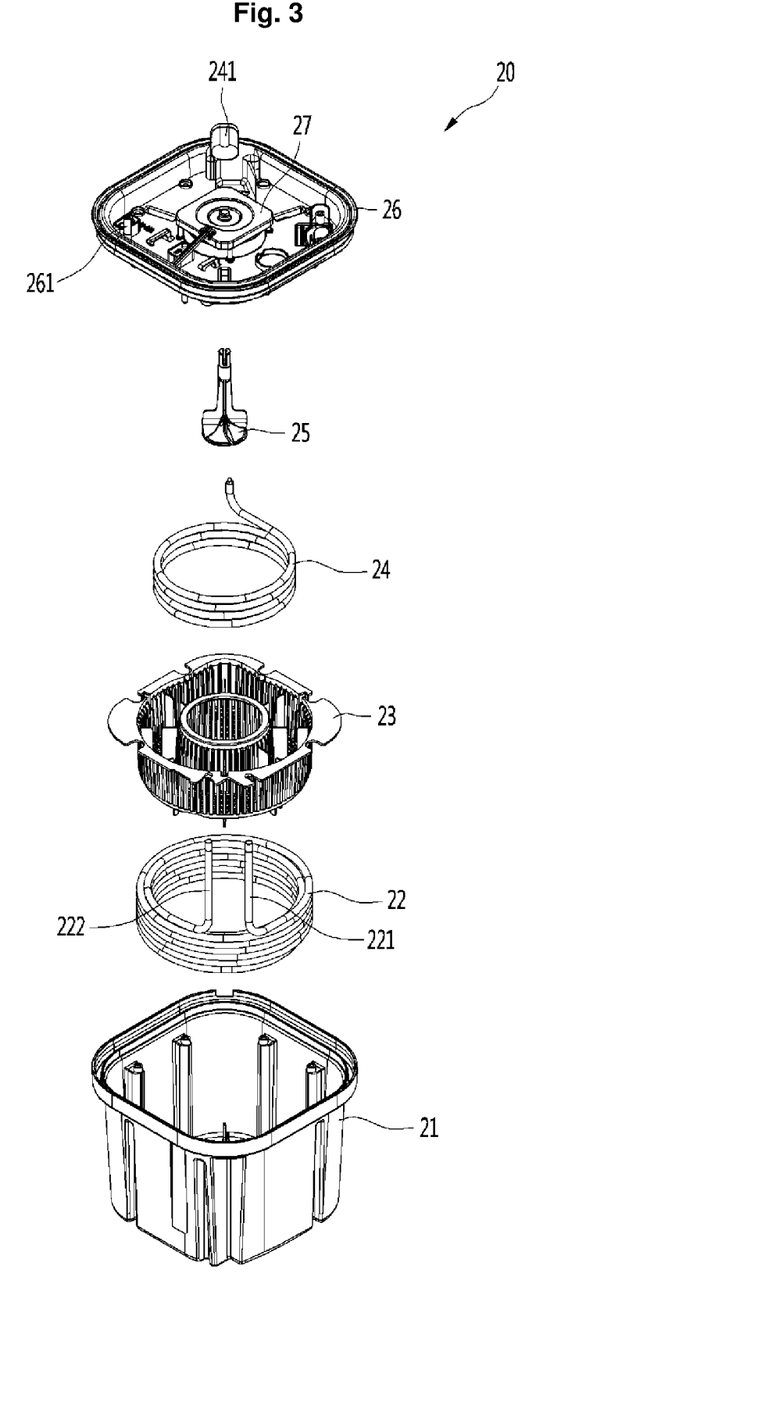
FIG. 3 is an exploded perspective view of the cold water production unit.
Figure 4:
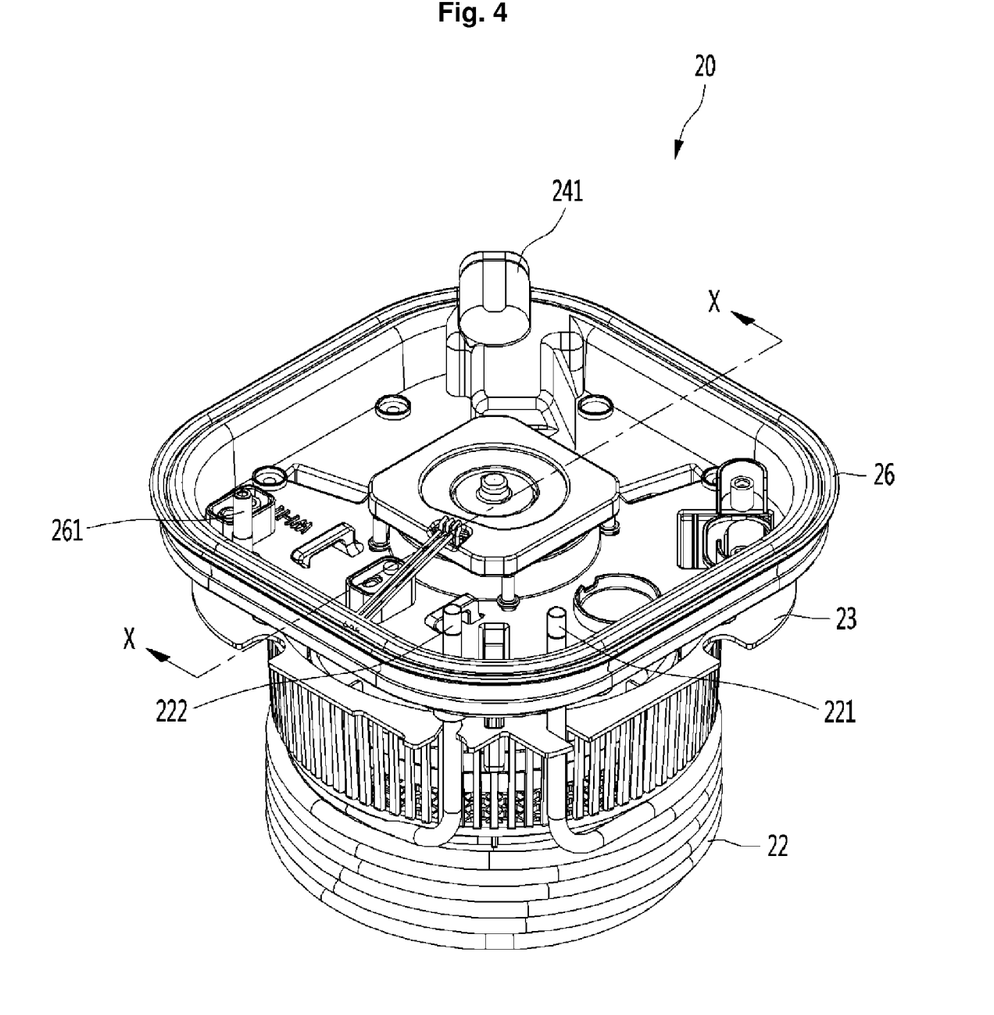
FIG. 4 is a perspective view of the assembly of the cold water production unit with a cooling water tank removed.

Referring to FIGS. 2 to 4, a cold water production unit (or chiller) 20 according to an embodiment of the present disclosure may include: a cooling water tank 21 that is filled with cooling water; an insulating case (not shown) that receives the cooling water tank 21 to insulate the cooling water tank 21 from the interior air; a drain valve (not shown) that is connected to the internal space of the cooling water tank 21 through the insulating case; a cold water pipe (or cold water coil) 22 that is provided in the cooling water tank 21; a separator 23 that is provided over the cold water pipe 22 in the cooling water tank 21; an evaporator (or evaporator coil) 24 that is provided inside the separator 23; a stirring motor support 26 that is provided at the top of the cooling water tank 21 and functions as a cover for sealing the cooling water tank 21; a stirring motor 27 that is fixed inside the stirring motor support 26 and has a rotary shaft extending downward; a stirring member (or stirring head) 25 that is provided in the cooling water tank 21 and is connected to the rotary shaft of the stirring motor 27; and a tank cover (not shown) that covers the open top of the cooling water tank 21.

In detail, the drain valve is provided through the insulating case and the cooling water tank 21 and is inserted through a side of the insulating case corresponding to a portion adjacent to the bottom of the cooling water tank 21. When the drain valve is opened, the water in the cooling water tank 21 can be discharged out of the water purifier 10.

The cold water pipe 22 may be formed in a cylindrical shape by spirally winding, as shown in the figures, and portions of the cold water pipe 22 that are vertically adjacent to each other may be spaced at a predetermined distance from each other. An inlet end 221 and an outlet end 222 of the cold water pipe 22 may vertically extend toward the stirring motor support 26. In the cold water pipe 22, the inlet end 221 may be connected to a channel connected to the water supplier and the outlet end 222 may be connected to a channel connected to the exit of the water chute 15.

The separator 23 may be provided over and within the cold water pipe 22 and divides the internal space of the cooling water tank 21 into a first space in which the evaporator 24 is provided and a second space in which the cold water pipe 22 is provided. The separator 23 is perforated to include openings or holes that allow a flow of the cooling water between the evaporator 24 and the cold water pipe 22. Accordingly, ice that is formed around the evaporator 24 in the first space and is larger than the perforations of the separator 23 cannot move to the cold water pipe 22 in the second space. Thus, the separator 23 helps prevents the ice from blocking a flow of cooling water around the cold water pipe 22.

The evaporator 24 may be provided inside a portion of the separator 23. The evaporator 24 is connected to the outlet end of the expansion valve that is connected to the outlet end of the condenser. A refrigerant that flows through a refrigerant pipe forming the evaporator 24 cools the cooling water in the cooling water tank 21 by exchanging heat with the cooling water within the cooling water tank 21. The cooling water cools purified water flowing through the cold water pipe 22 by a second heat exchange.

The stirring motor support 26 may be provided over the separator 23. The stirring motor support 26 is coupled to the top of the cooling water tank 21, whereby it can cover the top of the first space receiving the evaporator 24. That is, the first space may be defined between the stirring motor support 26 and the separator 23, while the second space may be defined between the separator 23 and the cooling water tank 21.

A cold water intake port 261 may be formed at a side of the stirring motor support 26. The cold water intake port 261 is connected to a channel to the water supplier or to channel passing carrying a purified water from the filter assembly so that the cooling water tank 21 can be supplied with the cooling water. An evaporator connector 241 may be formed at another portion or side of the stirring motor support 26. The evaporator connector 241 may be connected to the inlet end of the evaporator 24 to provide the refrigerant to the evaporator 24.

The stirring member 25 may be positioned substantially in a middle portion of the second space, but is not limited thereto. When the stirring member 25 is rotated (e.g., by the stirring motor 27), the cooling water is freely moved and mixed between the first space and the second space within the cooling water tank 21. Accordingly, the temperature of the cooling water cooled by the evaporator 24 may be more uniformly maintained throughout the inside of the cooling water tank 21. The stirring member 25 may be formed in a blade shape or an impeller shape radially extending from the rotary shaft, as shown in the figures, but is not limited thereto and may be formed in various shapes.

Figure 5:
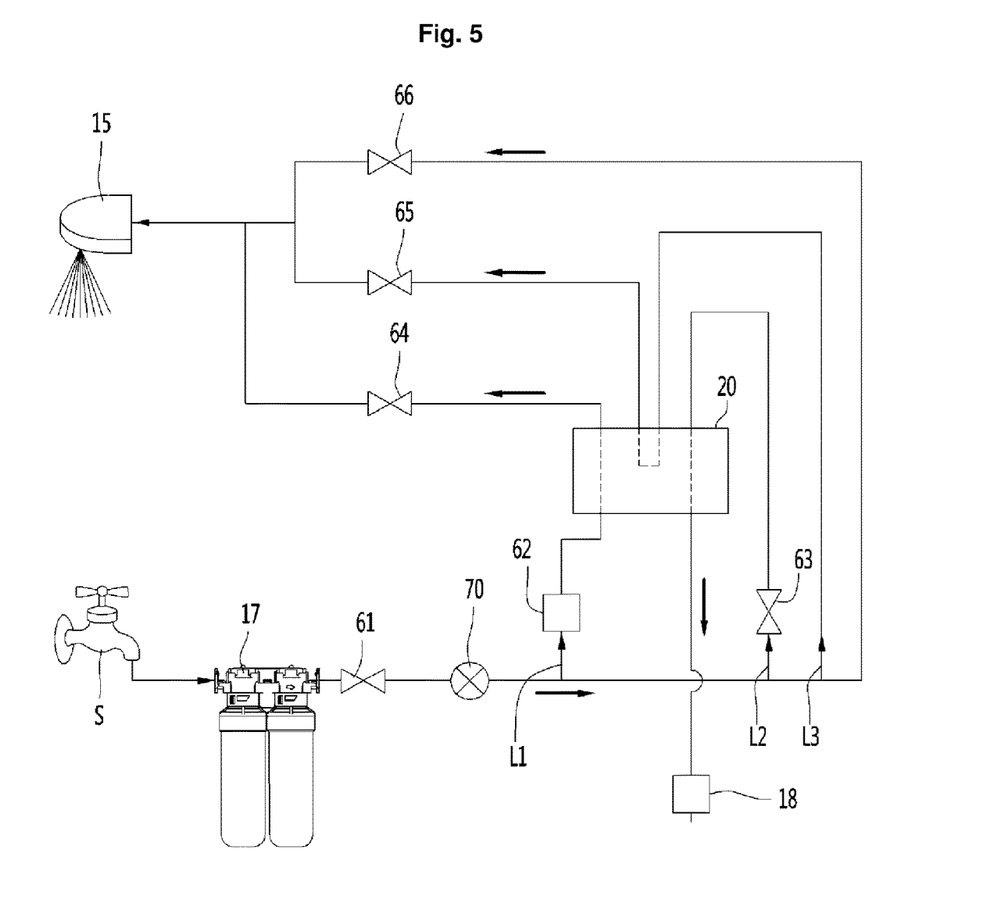
FIG. 5 is a system diagram showing a water channel connected to the water purifier according to the first embodiment of the present disclosure.

FIG. 5 is a system diagram showing a water channel associated with the water purifier 10 according to an embodiment of the present disclosure. Referring to FIG. 5, a water supply line L is formed from a water supplier S to the water chute 15 of the water purifier 10 and various valves and components for purifying water may be connected to the water supply line L. In detail, the water supply line L is connected to the water supplier S, for example, a faucet in a house, and a filter assembly 17 is provided at a predetermined portion of the water supply line L, so that the filter assembly 17 can filter or remove foreign substances to purify the water supplied from the water supplier S.

A water supply valve 61 and a flow sensor 70 may be sequentially provided on the water supply line L connected to the outlet end of the filter assembly 17. Accordingly, when the amount of water sensed by the flow sensor 70 reaches a set flow rate, the water supply valve 61 can be controlled to maintain this flow rate. A hot water line L1, a cooling water line L2, and a cold water line L3 may diverge from a predetermined portion of the water supply line L extending from the outlet end of the flow sensor 70.

A purified (i.e., room temperature) water valve 66 may be provided at the end of the water supply line L extending from the outlet end of the flow sensor 70 and a hot water valve 64 may be provided at the end of the hot water line L1. A cold water valve 65 may be provided at the end of the cold water line L3, and a cooling water valve 63 may be provided at a predetermined portion of the cooling water line L2. In detail, the cooling water valve 63 is provided at a predetermined portion of the water supply line L that connects the cooling water intake port 261 and the diverging point of the cooling water line L2, so cooling water valve 63 can control the amount of cooling water that is supplied to the cooling water tank 21.

The water supply lines extending from the outlet ends of the hot water valve 64, the cold water valve 65, and the purified water valve 66 may all be connected to the water chute 15. Further, as shown in the figures, the purified (i.e., room temperature) water, the cold water, and the hot water may be connected to a single output or may be connected to respective different outputs.

The drain valve 18 may be provided on a water supply line extending out of the cold water production unit 20, as shown in FIG. 5. In another example, the drain valve 18 may be inserted through the cooling water tank 21, as described above.

A flow control valve 62 may be provided at a predetermined position of the hot water line L1 (e.g., after the flow sensor 70), and a heater (not shown) may be connected to the hot water line L1 extending from an outlet end of the flow control valve 62. A hot water valve 64 may be provided in a portion of the water supply line L that extends from an outlet end of the heater. For example, water may be heated to a predetermined temperature in the heater after flowing through the hot water line L1, and when a hot water button of the operation display unit 14 (or other input) is selected, the hot water valve 64 is opened to dispense hot water through the water chute 15.

Figure 6:
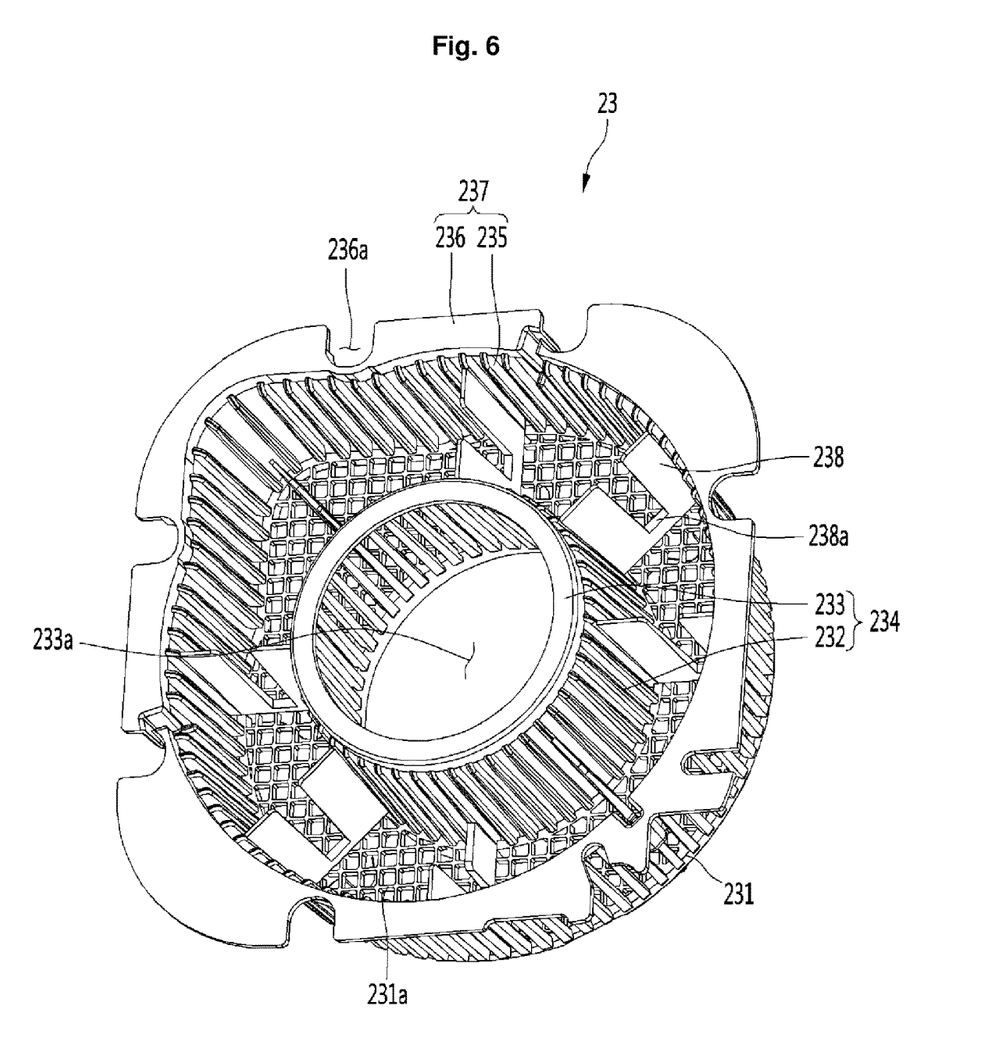
FIG. 6 is a top perspective view of a separator that is combined with the cold water production unit of the water purifier according to the first embodiment of the present disclosure.

The separator 23 according to the present disclosure is described hereafter in detail with reference to the drawings. FIG. 6 is a top perspective view of the separator that is combined with the cold water production unit of the water purifier according to the first embodiment of the present disclosure and FIG. 7 is a bottom perspective view of the separator.

Figure 7:
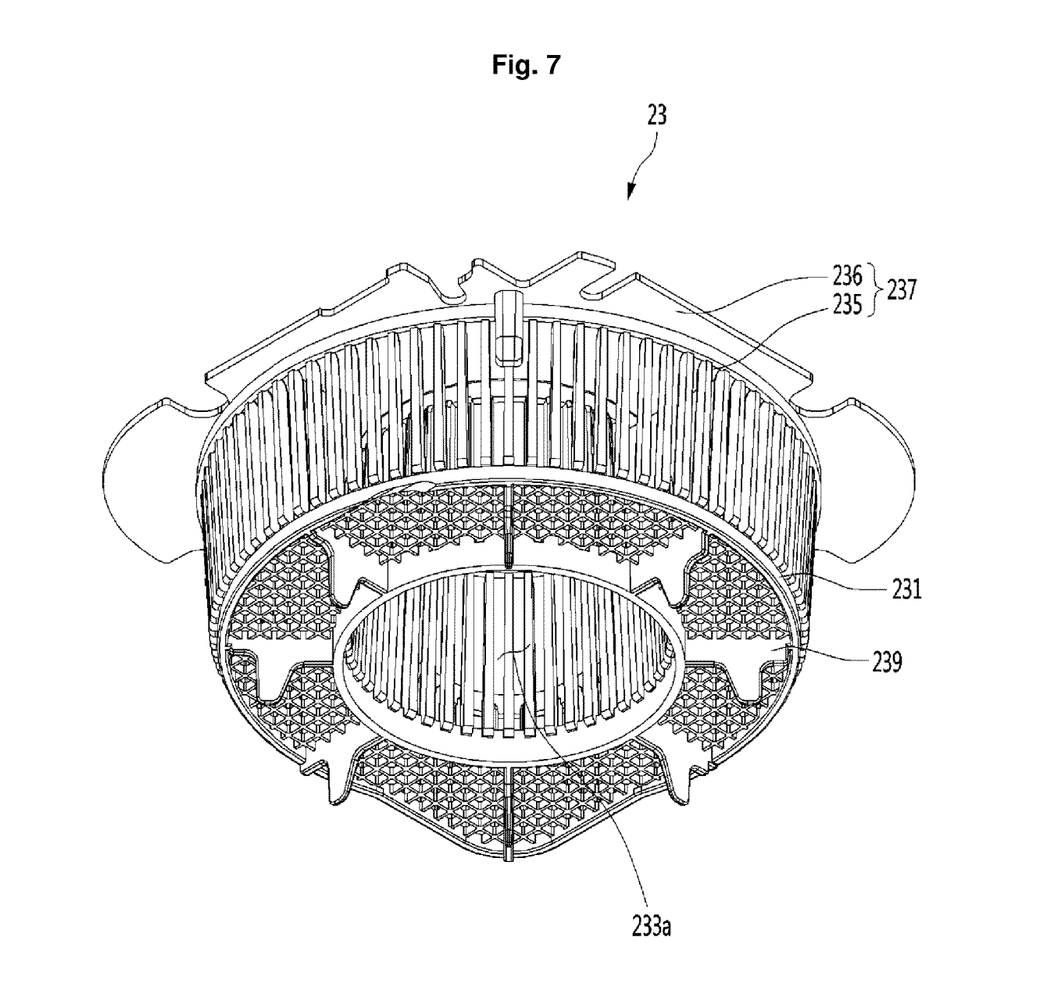
FIG. 7 is a bottom perspective view of the separator.

FIG. 6 is a top perspective view of the separator 23 that is combined with the cold water production unit of the water purifier according to an embodiment of the present disclosure and FIG. 7 is a bottom perspective view of the separator 23. Referring to FIGS. 6 and 7, the separator 23 may be molded plastic. In particular, the separator 23 may be made of soft bendable plastic, such as a polyethylene. The separator 23 is provided inside the cooling water tank 21 and may have a conical shape, such that the separator 23 divides the internal space of the cooling water tank 21 into the first space within the separator 23 and the second space outside the separator 23. A portion (e.g., a top rib 236) may be fixed to an inner surface of the cooling water tank 21, or may be held in a desired positioned through contact with the cold water pipe 22 and/or the evaporator 24.

In detail, the separator 23 may have a bottom (or bottom layer) 231 horizontally placed in the cooling water tank 21, a first extension 234 extending upward from a portion of the bottom 231, and a plurality of separation walls 238 extending upward from the bottom 231 to divide the first space into several spaces. The bottom 231 is composed of a plurality of latticed ribs 231a, and holes through which cooling water flows are formed between the latticed ribs 231a. Cooling water within the cooling water tank can freely move between the first space and the second space through the holes the latticed ribs 231a. The bottom 231 may be formed in a shape that is substantially similar to a corresponding transverse plane in the cooling water tank 21. For example, the size and shape of the bottom 231 may closely correspond to a corresponding portion of an interior side surface of the cooling water tank 21.

A substantially circular center hole may be formed substantially at or near the center of the bottom 231, and the first extension 234 may extends upward from the edge of the center hole. In detail, the first extension 234 may have a plurality of first vertical ribs 232 extending upward from the edge of the center hole and a circular band-shaped first top rib 233 connecting the upper ends of the first vertical ribs 232.

The first vertical ribs 232 may be arranged with substantially regular intervals around the center hole in the bottom 231. The first vertical ribs 232 may include ribs vertically extending from (e.g., orthogonal to) a horizontal surface (e.g., from bottom 231). The first vertical ribs 232 may further include ribs extending at an angle from the horizontal surface or that otherwise extend between two or more of vertically extending ribs. A cylindrical or a truncated conical space may be formed by the first vertical ribs 232 and the first top rib 233, and this space may be referred to as a stirring member hole (or stirring member cavity) 233a. That is, the stirring member 25 may be positioned in the second space of the cooling water tank 21 through the stirring member hole 233a. The space formed inside the first extension 234 (that is, the stirring member hole 233a) may also be referred to herein as a "third" space.

The separation walls 238 are formed in planar shapes and may extend laterally from the first vertical ribs 232 and vertically upwards from the bottom 231 to divide the first space into several sub-regions. In detail, the separation walls 238 may be arranged at regular intervals around the center hole. Accordingly, the first space can be divided into several sub-regions defined by the first vertical ribs 232, the separation walls 238, and the inner side of the cooling water tank 21. Therefore, ice that is formed in the first space through a heat exchange between the evaporator 24 and the cooling water in the tank 21 can remain in one of sub-regions inside the first space and is blocked from moving to the other sub-regions inside the first space.

The separation walls 238 may each have a seating groove 238a for holding the evaporator 24. That is, the refrigerant pipe of the evaporator 24 may be spirally wound several times through the seating grooves 238a of the separation walls 238. The width of the seating grooves 238a may be the same as or slightly larger than an outer diameter of the refrigerant pipe of the evaporator 24 so that the evaporator 24 may be received in and supported by the seating grooves 238a.

The separation walls 238 may be integrally formed with the bottom 231. Alternatively, the separation walls 238 may be detachably formed. For example, the separation wall 238 may be detachably fitted in the bottom 231 or may be fitted between the first vertical ribs 232 and the second vertical ribs 235. That is, the separation walls 238 may be selectively attached and detached by a user.

The separator 23 may further have second extensions 237 extending upward from an outside edge of the bottom 231. In detail, the second extension 237 may have a plurality of second vertical ribs 235 extending upward from the edge of the bottom 231 and a second top rib 236 connecting the upper ends of the second vertical ribs 235. The second top rib 236 may be fitted in the cooling water tank 21. That is, the outer edge of the second top rib 236 may be brought in close contact with the inner interior surface of the cooling water tank 21.

Coupling grooves 236a may be formed at a lateral outside edge of the second top rib 236, and the coupling grooves 236a may be sized and positioned to fit on coupling projections (not shown) formed on the inner surface of the cooling water tank 21 to couple the separator 23 to the inner surface of the cooling water tank 21. The coupling grooves 236a may be formed in various shapes, quantities, or locations, depending on the shapes, quantities, or locations of the coupling projections.

The second vertical ribs 235 may be spaced around the edge of the bottom 231 and may be coupled to or otherwise extend from an upper surface of the bottom 231. The second vertical ribs 235 are arranged around the separation walls 238, and some of the second vertical ribs 235 may be connected to the ends of the separation walls 238. The separation wall 238 may be positioned between the first vertical ribs 232 and the second vertical ribs 235. Accordingly, the first space can be divided into several spaces by the first vertical ribs 232, the separation walls 238, and the second vertical ribs 235. Therefore, as previously described, ice that is formed near the evaporator 24 in one of the sub-regions of the first space remains in that sub-regions and is blocked by the separation walls 238 from moving to the other sub-regions of the first space. Consequently, ice coming off the evaporator 24 does not contact the walls of the cooling water tank 21, so the ice does not generate noise by impacting the cooling water tank 21 and does not damage the cooling water tank 21.

Cold water pipe seats (or cold water pipe extensions) 239 may be formed in an underside of the bottom 231. The cold water pipe seats 239 may protrude from the underside of the bottom 231 and may be partially stepped. For example, the cold water pipe seats 239 may have stepped sides that are rounded with a curvature corresponding to the outer diameter of a portion of a coiled shape formed by winding the cold water pipe 22. Accordingly, an uppermost portion of the cold water pipe 22 can be seated on the cold water pipe seats 239 (see FIG. 8).

Figure 8:
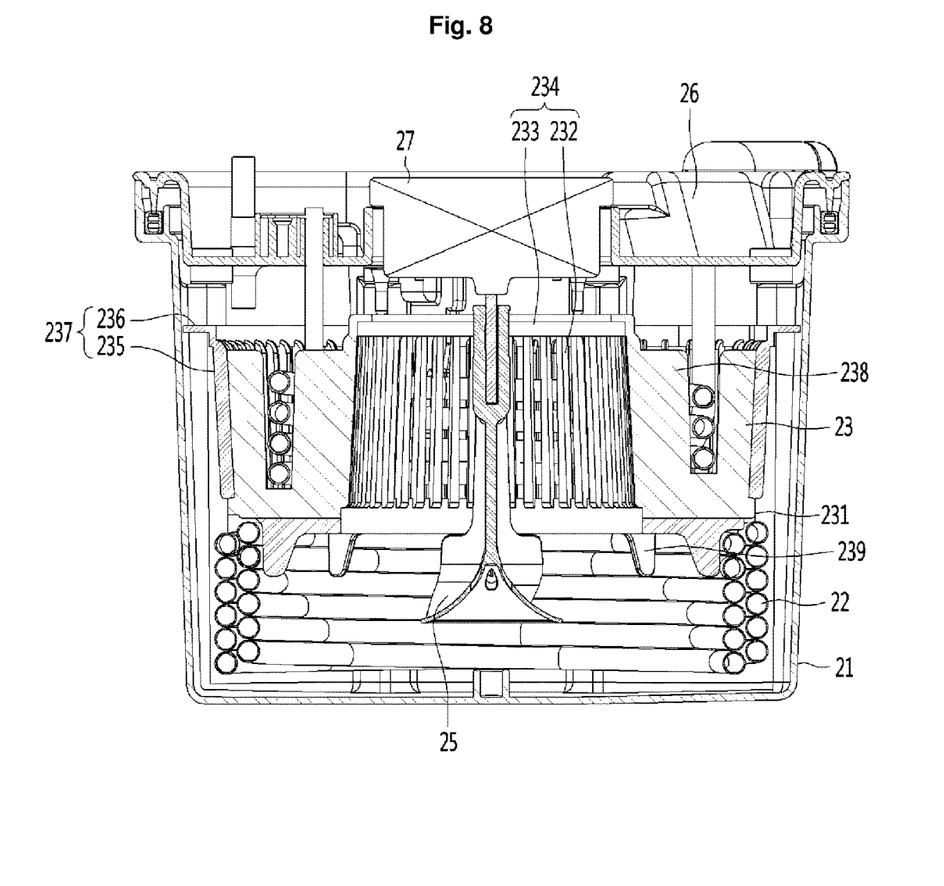
FIG. 8 is a vertical cross-sectional view taken along line X-X of FIG. 4.

FIG. 8 is a vertical cross-sectional view taken along line X-X of FIG. 4. Referring to FIG. 8, the internal space of the cooling water tank 21 is divided into the first space and the second space by the separator 23, and a third space can be formed in the first space by the first extension 234, as previously described. The first space, with the exception of the third space, can be divided into several spaces by the separation walls 238.

In detail, the first space may be formed over the bottom 231 of the separator 23, and the second space may be formed under the bottom 231. The first space is divided into several sub-regions by the first extension 234, the separation walls 238, and the second extension 237.

The cold water pipe 22 is positioned above a bottom surface of the cooling water tank 21, and the separator 23 is positioned over the cold water pipe 22 in the cooling water tank 21. The outer edge of the second top rib 236, formed on the top portion of the separator 23, is in close contact with an inner surface of the cooling water tank 21 to position and fix the separator 23 in the cooling water tank 21. The cold water pipe seats 239 may be formed on the underside of the bottom 231 and may extend downward to contact and hold a portion of the cold water pipe 22 in a desired positioned.

The refrigerant pipe of the evaporator 24 may be wound several times inside the separator 23 to form a substantially round coiled shape. The coiled refrigerant pipe 24 may be supported in the seating grooves 238a of the separation walls 238 provided in the separator 23 to position the evaporator 24 in the first space.

When the stirring member 25 is rotated (e.g., by the storing motor 27), the cooling water is moved in the cooling water tank 21, such as to move between the first space and the second space. This motion of the cooling water helps to maintain more uniform internal temperatures within the cooling water tank 21. Otherwise, water cooled by contact with the evaporator 24 may remain in the first space, and water warmed by contact with the cold water pipe 22 may remain in the second space, limiting the ability of cold water production unit 20 to cool the purified water passing through the cold water pipe 22.

Furthermore, the movement of the cooling water caused by the stirring motion of the stirring member 25 helps to melt ice generated in the first space by circulating relatively warmer water toward the ice. As previously described, the ice formed in the first space by contact with the evaporator 24 may be isolated in the first space by the separator 23 so that the ice cannot be move to the second space while the cooling water can circulate between the first and second spaces. Furthermore, since the first space is divided into several sub-regions by the separation walls 238 of the separator 23, ice formed in one of the sub-regions does not move to the other sub-regions. Thus, the ice made in the sub-regions cannot freely move within the first space to other sub-regions since the movement of the ice is limited by the separation walls 238. Consequently, the separation walls 238 may prevent a movement or a rotation of ice within the first region due to clockwise or counterclockwise flow of water that is formed by the stirring motion of the stirring member 25. Accordingly, the motion of the stirring member 25 does not cause the ice to move and contact the stirring member 25, the cold water pipe 22, the evaporator 24, or the interior surface of the cooling water tank 21, preventing the ice from damaging to these components and reducing noises caused by the ice impacting these components.

Figure 9:
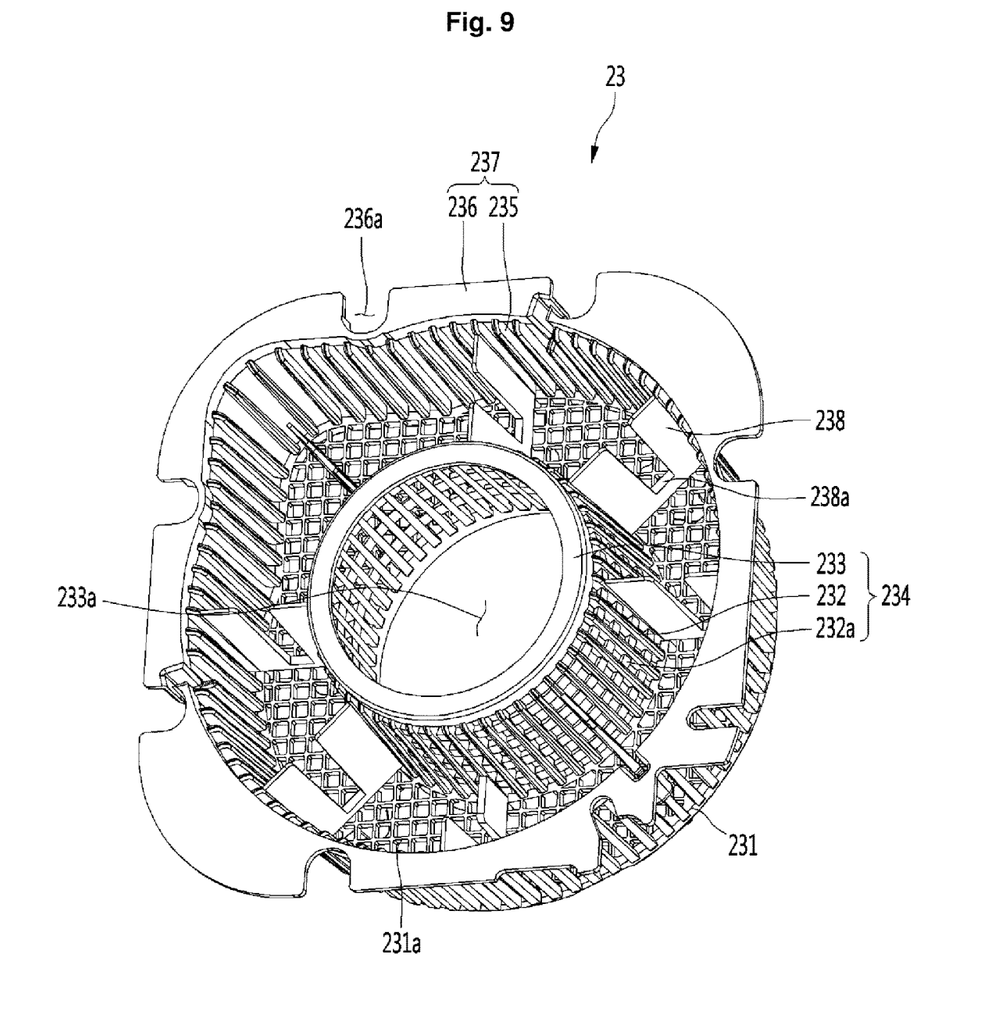
FIG. 9 is a perspective view showing a separator according to a second embodiment of the present disclosure.

FIG. 9 is a perspective view showing a separator 23 according to a second embodiment of the present disclosure. This embodiment is the similar as the first embodiment depicted in FIGS. 6 and 7 except for the structure of the first extension 234. Accordingly, only the specific configuration of this embodiment is described hereafter, and other aspects of the first embodiment are applicable to the separator 23 depicted in FIG. 9. Referring to FIG. 9, a separator 23 may include a bottom (or bottom layer) 231, a first extension 234, a second extension 237, and separation walls 238. The shapes and arrangements of the bottom 231, the second extension 237, and the separation walls 238 depicted in FIG. 9 correspond to the shapes and arrangements for similarly numbered components discussed with respect to FIGS. 6 and 7.

According to the embodiment depicted in FIG. 9, the first extension 234 may include first vertical ribs 232 extending upward from the top of the bottom 231 and arranged at substantially regular intervals circumferentially around the center hole 233a. The first extension 234 may further include a plurality of horizontal ribs 232a horizontally extending and connecting the first vertical ribs 232. The horizontal ribs 232a may be spaced at a predetermined distance from each other in the longitudinal direction of the first vertical ribs 232. That is, the first vertical ribs 232 and the horizontal ribs 232a may form a lattice. According to the configuration depicted in FIG. 9, the first extension 234 is composed of latticed ribs, so it is possible to prevent small pieces of ices formed around the evaporator 24 from flowing into the second space through the first extension 234.

Figure 10:
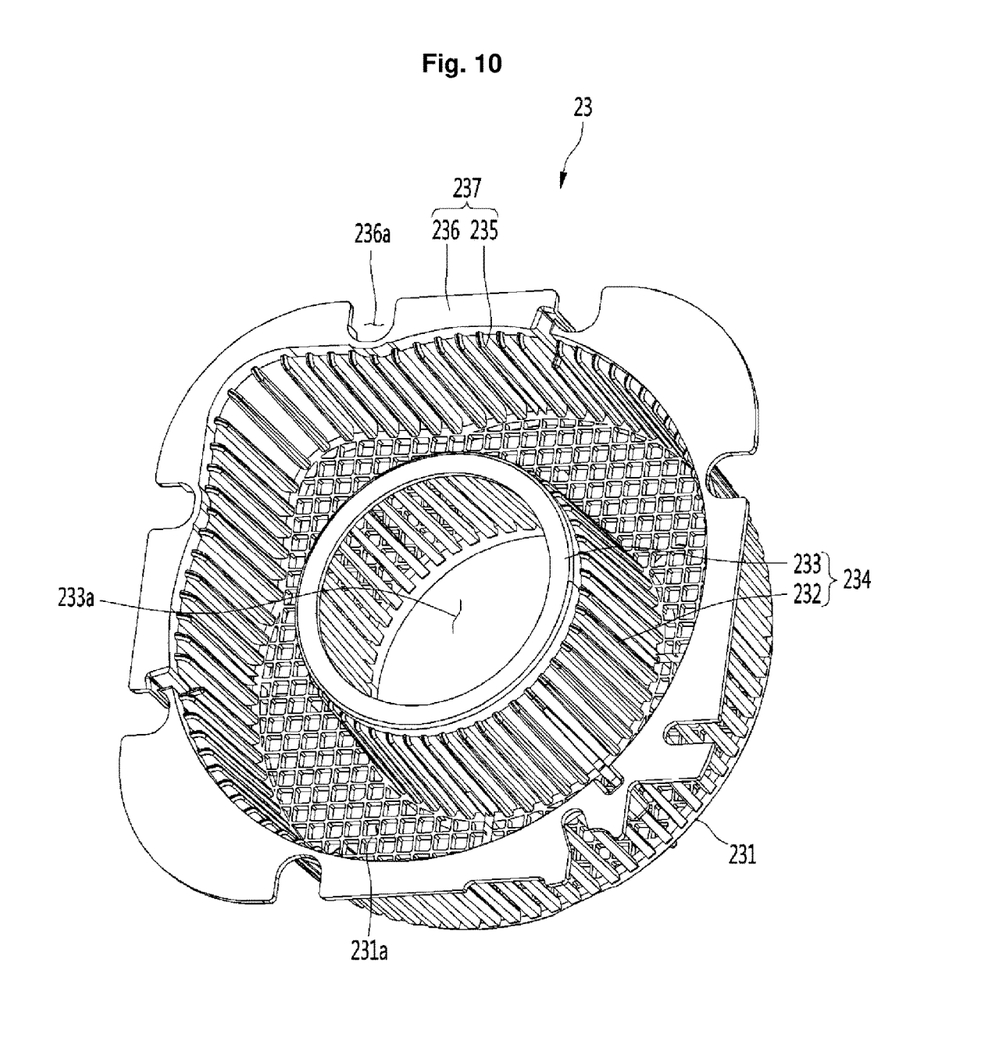
FIG. 10 is a perspective view showing a separator according to a third embodiment of the present disclosure.

FIG. 10 is a perspective view showing a separator according to a third embodiment of the present disclosure. This embodiment depicted in FIG. 10 substantially corresponds to the first embodiment depicted in FIGS. 6 and 7 except that the separation walls of the separator are not provided. Accordingly, only the specific configuration of this embodiment is described hereafter, and other aspects of the first embodiment are applicable to the separator 23 depicted in FIG. 10. For example, referring to FIG. 10, the separator 23 may include a bottom 231, a first extension 234, and a second extension 237. The shapes and arrangements of the bottom 231, the second extension 237, and the separation walls 238 depicted in FIG. 9 correspond to the shapes and arrangements for similarly numbered components discussed with respect to FIGS. 6 and 7.

In the example shown in FIG. 10, separation walls 238 for dividing the first space into a plurality of spaces may be removed or otherwise omitted from the separator 23. Accordingly, ice coming off the evaporator 24 can freely move in the first space, but cannot hit against the inner side of the cooling water tank 21 due to the second extension 237 at the outside radial surface of the separator 23. Accordingly, it is possible to prevent the ice from generating noise by hitting against the inner side of the cooling water tank 21.

An aspect of the present disclosure provides a water purifier in which a first space, where an evaporator pipe is provided, and a second space, where a cold water pipe is provided, are divided by a separator, whereby cooling waters are freely moved and mixed in the two spaces and ice produced around the evaporator does not generate noise because it is isolated and prevented from hitting against a stirring member or the cold water pipe.

Another aspect of the present disclosure provides a water purifier in which a space, where an evaporator pipe is provided, is divided into several spaces by a separator, so ice produced in one of the spaces is isolated and prevented from hitting against the evaporator or sides of an associated cooling tank, such that noise is not generated by the ice.

Another aspect of the present disclosure provides a water purifier in which ice produced around an evaporator does not contact a stirring member, a cold water pipe, the evaporator, or a cooling water tank, thereby preventing the stirring member, the cold water pipe, the evaporator, and the cooling water tank from being damaged.

A water purifier according to one aspect includes: a cooling water tank that keeps cooling water; a stirring member that is provided in the cooling water tank to stir cooling water; a cold water pipe that is provided in the cooling water tank; an evaporator that is provided in the cooling water tank; and a separator on which the evaporator is provided and that is provided over the cold water pipe to divide the internal space of the cooling water tank into a first space and a second space.

The separator may have: a bottom that is horizontally formed and has a center hole through which the stirring member is inserted; a first extension that extends upward from the edge of the center hole; and a plurality of separation walls that extend upward from the top surface of the bottom and are arranged at a predetermined distance from each other around the center hole. The separator may further have a second extension that extends upward from the outer edge of the bottom.

In one embodiment, a water purifier comprises: a tank that holds a first liquid; a stirring head that is provided in the tank to stir the first liquid; a pipe that is provided in the tank to contact the first liquid, the pipe carrying a second liquid to be cooled through the contact between the pipe and the first liquid; an evaporator that is provided in the tank to contact the first liquid, the evaporator carrying refrigerant to cool the first liquid in the tank; and a separator to divide an internal space of the tank into a first space receiving the evaporator and a second space receiving the pipe, wherein the separator includes: a bottom layer that extends horizontally and has a hole through which a portion of the stirring head is inserted; a first extension that extends upward from an edge of the hole; and a plurality of separation walls that extend upward from a top surface of the bottom layer and extend radially from hole to divide the first space into a plurality of sub-spaces.

In another embodiment, a water purifier comprises a tank that holds a first liquid; a stirring head that is provided in the tank to stir the first liquid; a pipe that is provided in the tank to contact the first liquid, the pipe carrying a second liquid to be cooled through the contact between the pipe and the first liquid; an evaporator that is provided in the tank to contact the first liquid, the evaporator carrying refrigerant to cool the first liquid in the tank; and a separator on which the evaporator is provided and that is provided over the pipe, wherein the separator includes: a bottom layer that extends horizontally and has a hole through which a portion of the stirring head is inserted; a first extension that extends upward from an edge of the hole; and a second extension that extends upward from outside edge of the bottom layer.

In another embodiment, a water purifier comprises a tank that holds a first liquid; a separator that includes a horizontal bottom layer that divides an internal space of the tank into a first space and a second space that are in fluid communication, an evaporator that is provided in first space, the evaporator carrying refrigerant to cool the first liquid in the tank; and a pipe that is provided in the second space, the pipe carrying a second liquid to be cooled through the contact between the pipe and the first liquid.

It should be understood that the present disclosure may be modified in various ways within the scope of the present disclosure by those skilled in the art and the scope of the present disclosure should be construed on the basis of claims.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid dispenser comprising:
a tank that holds a first liquid;
a stirring head that is provided in the tank to stir the first liquid;
a pipe that is provided in the tank to contact the first liquid, the pipe carrying a second liquid to be cooled through the contact between the pipe and the first liquid;
an evaporator that is provided in the tank to contact the first liquid, the evaporator carrying refrigerant to cool the first liquid in the tank; and
a separator to divide an internal space of the tank into a first space receiving the evaporator and a second space receiving the pipe,
wherein the separator includes:
a bottom layer that extends horizontally and has a hole through which a portion of the stirring head is inserted;
a first extension that extends upward from an edge of the hole; and
a plurality of separation walls that extend upward from a top surface of the bottom layer and extend radially from hole to divide the first space into a plurality of sub-spaces.

2. The liquid dispenser of claim 1, wherein the bottom layer is composed of latticed ribs, and the first space and the second space communicate through openings between the latticed ribs.

3. The liquid dispenser of claim 2, wherein the first extension includes:
a plurality of first vertical ribs that extend a predetermined distance upward from the top surface of the bottom layer and are positioned around the hole in the bottom layer; and
a first top rib that connects upper ends of the first vertical ribs.

4. The liquid dispenser of claim 3, wherein:
the first extension further includes a plurality of horizontal ribs that extend horizontally and connect the first vertical ribs, and
a pair of the horizontal ribs are spaced apart by a predetermined distance in the longitudinal direction of the first vertical ribs.

5. The liquid dispenser of claim 3, wherein the hole and the first top rib have a circular shape, and
a diameter of the center hole is equal to or larger than an inner diameter of the first top rib.

6. The liquid dispenser of claim 3, wherein:
the separator further includes a second extension that extends upward from a peripheral edge of the bottom layer, and
the second extension includes:
a plurality of second vertical ribs that extend upward from the top surface of the bottom layer and are arranged along the peripheral edge of the bottom layer; and
a second top rib that connects upper ends of the second vertical ribs.

7. The liquid dispenser of claim 6, wherein an outer edge of the second top rib is positioned within a threshold distance of an interior side surface of the tank.

8. The liquid dispenser of claim 6, wherein:
the separation walls are formed between the first vertical ribs and the second vertical ribs, and
seating grooves for receiving the evaporator are formed in the separation walls.

9. The liquid dispenser of claim 8, wherein the evaporator includes a refrigerant pipe that is spirally wound and is received in the seating grooves.

10. A liquid dispenser comprising:
a tank that holds a first liquid;
a stirring head that is provided in the tank to stir the first liquid;
a pipe that is provided in the tank to contact the first liquid, the pipe carrying a second liquid to be cooled through the contact between the pipe and the first liquid;
an evaporator that is provided in the tank to contact the first liquid, the evaporator carrying refrigerant to cool the first liquid in the tank; and
a separator on which the evaporator is provided and that is provided over the pipe,
wherein the separator includes:
a bottom layer that extends horizontally and has a hole through which a portion of the stirring head is inserted;
a first extension that extends upward from an edge of the hole; and
a second extension that extends upward from outside edge of the bottom layer.

11. The liquid dispenser of claim 10, wherein the first extension includes:
a plurality of first vertical ribs that extend a predetermined distance upward from a top of the bottom layer and are arranged around the hole in the bottom layer; and
a first top rib that connects upper ends of the first vertical ribs.

12. The liquid dispenser of claim 11, wherein the first extension further includes a plurality of horizontal ribs that extend horizontally and connect the first vertical ribs.

13. The liquid dispenser of claim 11, wherein the second extension includes:
a plurality of second vertical ribs that extend a predetermined distance upward from the top of the bottom layer and are positioned along a peripheral edge of the bottom layer; and
a second top rib that connects upper ends of the second vertical ribs.

14. The liquid dispenser of claim 13, wherein an outer edge of the second top rib is positioned within a threshold distance of an interior side surface of the tank.

15. The liquid dispenser of claim 13, wherein the separator further includes a plurality of separation walls that extend upward from the top of the bottom layer and extend radially from hole to divide the first space into a plurality of sub-spaces.

16. The liquid dispenser of claim 15, wherein the separation walls extend between the first vertical ribs and the second vertical ribs.

17. The liquid dispenser of claim 14, wherein:
the second top rib includes one or more coupling grooves formed at a lateral outside edge of the second top rib, and
the coupling grooves are configured to fit on coupling projections formed on an inner surface of the tank.

18. A liquid dispenser comprising:
a tank that holds a first liquid;
a separator that includes a horizontal bottom layer that divides an internal space of the tank into a first space and a second space that are in fluid communication,
an evaporator that is provided in the first space, the evaporator carrying refrigerant to cool the first liquid in the tank;
a pipe that is provided in the second space, the pipe carrying a second liquid to be cooled through a contact between the pipe and the first liquid;
a stirring head that is provided in the tank to stir the first liquid, wherein the bottom layer includes a hole through which a portion of the stirring head extends; and
a stirring motor support, wherein a stirring motor that rotates the stirring head is positioned on a top surface of the stirring motor support and the stirring motor support is provided over the separator.

19. A liquid dispenser comprising:
a tank that holds a first liquid;
a separator that includes a horizontal bottom layer that divides an internal space of the tank into a first space and a second space that are in fluid communication,
an evaporator that is provided in the first space, the evaporator carrying refrigerant to cool the first liquid in the tank; and
a pipe that is provided in the second space, the pipe carrying a second liquid to be cooled through the contact between the pipe and the first liquid,
wherein the separator further include % a plurality of separation walls that extend upward from a top surface of the bottom layer to divide the first space into a plurality of sub-spaces.

* * * * *